(12) United States Patent
Ahmed et al.

(10) Patent No.: US 7,163,969 B2
(45) Date of Patent: Jan. 16, 2007

(54) SUPERABSORBENT POLYMER AQUEOUS PASTE AND COATING

(75) Inventors: Iqbal Ahmed, Greensboro, NC (US); Angela M. Jones, High Point, NC (US); Scott Tomlin, Greensboro, NC (US); Scott J. Smith, Greensboro, NC (US)

(73) Assignee: Stockhausen, Inc., Greensboro, NC (US)

( * ) Notice: Subject to any disclaimer, the term of this patent is extended or adjusted under 35 U.S.C. 154(b) by 457 days.

(21) Appl. No.: 10/685,080

(22) Filed: Oct. 14, 2003

(65) Prior Publication Data

US 2005/0080182 A1    Apr. 14, 2005

(51) Int. Cl.
*C09K 8/04*    (2006.01)
*C08L 33/00*    (2006.01)

(52) U.S. Cl. ...................................... 523/130; 524/832
(58) Field of Classification Search ................ 523/130; 524/832
See application file for complete search history.

(56) References Cited

U.S. PATENT DOCUMENTS

| | | |
|---|---|---|
| 4,635,726 A | 1/1987 | Walker |
| 5,817,713 A | 10/1998 | Pappas et al. |
| 6,013,325 A * | 1/2000 | Houben et al. .......... 427/389.9 |
| 6,380,298 B1 | 4/2002 | Flautt et al. |
| 6,488,999 B1 | 12/2002 | Flynn et al. |
| 6,581,701 B1 | 6/2003 | Heying |

OTHER PUBLICATIONS

International Search Report mailed on Jan. 31, 2005 in PCT/US2004/034004.
Written Opinion of the International Searching Authority mailed on Jan. 31, 2005 in PCT/US2004/034004.

* cited by examiner

*Primary Examiner*—Tae H Yoon
(74) *Attorney, Agent, or Firm*—Smith Moore LLP

(57) ABSTRACT

The present invention is directed to an aqueous superabsorbent polymer paste comprising from about 1 to about 5 wt % of superabsorbent particles and from about 95 to about 99 wt % of an aqueous water-soluble solution having from about 0.5 to about 5%, preferably from about 1 to about 3% solid level. The present invention is also directed to a coated substrate comprising a substrate material and an aqueous superabsorbent polymer paste comprising a blend of i) from about 1 to about 5 wt % of superabsorbent particles and ii) from about 95 to about 99 wt % of an aqueous water-soluble solution. The present invention is also directed to a method for reducing the loss of circulation fluids into flow passages of a subterranean formation during well drilling, completion or work over operations, by using the aqueous superabsorbent polymer paste of the present invention.

16 Claims, No Drawings

SUPERABSORBENT POLYMER AQUEOUS PASTE AND COATING

FIELD OF THE INVENTION

The invention relates to aqueous superabsorbent polymer paste and coating, which absorb water and other aqueous liquids. The present invention also relates to preparation of these aqueous superabsorbent polymer pastes and coatings and their use as absorbents in various applications including coating substrates and well drilling.

BACKGROUND OF THE INVENTION

Superabsorbent refers to a water-swellable, water-insoluble, organic or inorganic material capable of absorbing at least about 10 times its weight and up to about 30 times its weight in an aqueous solution containing 0.9 weight percent sodium chloride solution in water. A superabsorbent polymer is a crosslinked polymer which is capable of absorbing large amounts of aqueous liquids and body fluids, such as urine or blood, with swelling and the formation of hydrogels, and of retaining them under a certain pressure in accordance with the general definition of superabsorbent.

The superabsorbent polymers that are currently commercially available are crosslinked polyacrylic acids or crosslinked starch-acrylic acid graft polymers, in which some of the carboxyl groups are neutralized with sodium hydroxide solution or potassium hydroxide solution. As a result of these characteristic properties, these polymers are chiefly used for incorporation into sanitary articles, such as babies' diapers, incontinence products or sanitary towels as well as industrial applications such as coatings for cables, for use in well borings and superabsorbent polymers in solvent based pastes.

U.S. Pat. No. 5,817,713 discloses superabsorbent polymer dispersed in polyvinyl chloride plastisol using an organic solvent. U.S. Pat. No. 6,013,325 discloses a swelling paste made of an admixture of an aqueous solution of a water-soluble polymer and at least one multifunctional alcohol as crosslinker and thickeners. U.S. Pat. No. 6,380,298 is directed to superabsorbent polymer coatings for fiber reinforced articles where in water-soluble superabsorbent polymer is used in conjunction with a binder resin. U.S. Pat. No. 6,488,999 is directed to a printable superabsorbent polymer label coating including a superabsorbent coating comprising a gelatinous material, a cross-linking agent and water.

Drilling fluids or drilling muds as they are sometimes called, are slurries of solids used in the drilling of wells in the earth for the purpose of recovering hydrocarbons and other fluid materials. Drilling fluids have a number of functions, the most important of which are lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and the pumping of the drilling fluid.

For a drilling fluid to perform these functions and allow drilling to continue, the drilling fluid must stay in the borehole. Frequently, undesirable formation conditions are encountered in which substantial amounts or, in some cases; practically all of the drilling fluid may be lost into the formation. Drilling fluid can leave the borehole through large or small fissures or fractures in the formation or through pores in the rock matrix surrounding the borehole.

U.S. Pat. No. 4,635,726 discloses a slug of superabsorbent polymer dispersed in hydrocarbon fluid used as additives for drilling fluids. U.S. Pat. No. 6,581,701 discloses methods for reducing lost circulation in well bores using the gel forming and water swellable polyacrylamide polymer that swells at a rate slow enough to reach the lost circulation zone of a well before those polymers have swollen to an extent that disrupts the drilling process.

It is therefore an object of the present invention to provide an aqueous superabsorbent polymer paste for use with substrates to enhance the properties of the substrate such as absorbency. Yet another object of the present invention is to provide an aqueous superabsorbent polymer paste for use with drilling fluids to enhance the properties of water retention and slug expansion for reducing lost circulation in well bores.

SUMMARY OF THE INVENTION

The present invention is directed to an aqueous superabsorbent polymer paste including from about 1 to about 5 wt % of superabsorbent polymer particles and from about 95 to about 99 wt % of an aqueous water-soluble polymer solution having from about 0.5 to about 5%, preferably from about 1 to about 3% solid level.

The present invention is further directed to an aqueous superabsorbent polymer paste comprising a) a composition comprising superabsorbent polymer particles prepared from about 55 to about 99.9 wt. % of polymerizable unsaturated acid group containing monomers; and from about 0.001 to about 5.0 wt. % of internal crosslinking agent; wherein the composition has a degree of neutralization of more than about 20%; and b) from about 95 to about 99 wt % of an aqueous water-soluble polymer solution having from about 0.5 to about 5%, preferably from about 1 to about 3% solid level.

The present invention is also directed to a method of preparing an aqueous superabsorbent polymer paste, said method comprising preparing an aqueous solution of superabsorbent polymer, which is formed from at least one monomer, where the pre-superabsorbent polymer is capable upon being subjected to heating of becoming a superabsorbent polymer; and preparing a paste by thoroughly blending from about 1 to about 5 wt % of the superabsorbent polymer with from about 95 to about 99 wt % of an aqueous pre-superabsorbent polymer solution having from about 0.5 to about 5%, preferably from about 1 to about 3% solid level.

The present invention is also directed to a coated substrate comprising a substrate material and an aqueous superabsorbent polymer paste comprising a blend of i) from about 1 to about 5 wt % of superabsorbent polymer particles and ii) from about 95 to about 99 wt % of an aqueous water-soluble polymer solution having from about 0.5 to about 5%, preferably from about 1 to about 3% solid level.

The present invention is also directed to a method for making a coated substrate comprising (a) preparing a dispersion comprising a particulate superabsorbent polymer and an aqueous water-soluble polymer solution; (b) contacting a substrate with the dispersion to form a coating layer of the dispersion on the substrate; and (c) heat curing the coating layer for a period of time sufficient to form a water swellable, semi-gel coating layer.

The present invention is also directed to a water swellable coating comprising an aqueous superabsorbent polymer paste comprising a dispersion of from about 1 to about 5 wt % of superabsorbent polymer particles and from about 95 to about 99 wt % of an aqueous water-soluble polymer solution wherein the water swellable coating is capable of absorbing and retaining a large quantity of water.

A method for reducing the loss of circulation fluids into flow passages of a subterranean formation during well drilling, completion or work over operations, method comprising:

(a) directly introducing at the well-head into an effective amount of an aqueous superabsorbent polymer paste comprising a blend of a) from about 1 to about 5 wt % of superabsorbent polymer particles and b) from about 95 to about 99 wt % of an aqueous water-soluble polymer solution; wherein the superabsorbent polymer particles have a particle size distribution in the range of greater than about 150 microns to smaller than about 850 microns and which swells from about 25 to 300 times its weight of tap water when placed therein, and (b) allowing the aqueous superabsorbent polymer paste to enter the lost circulation zone and allowing the aqueous superabsorbent polymer paste to remain in said zone to absorb the aforesaid weight of water and swell to the appropriate volume thereby sealing fissures and reducing the loss of said circulation fluid upon resuming well drilling, completion or work-over operations.

DESCRIPTION OF THE PREFERRED EMBODIMENTS

Superabsorbent refers to a water-swellable, water-insoluble, organic or inorganic material capable of absorbing at least about 10 times its weight and up to about 30 times its weight in an aqueous solution containing 0.9 weight percent sodium chloride solution in water. A superabsorbent polymer is a crosslinked polymer which is capable of absorbing large amounts of aqueous liquids and body fluids, such as urine or blood, with swelling and the formation of hydrogels, and of retaining them under a certain pressure in accordance with the general definition of superabsorbent. The term crosslinked used in reference to the superabsorbent polymer refers to any means for effectively rendering normally water-soluble materials substantially water-insoluble but swellable. Such a crosslinking means can include for example, physical entanglement, crystalline domains, covalent bonds, ionic complexes and associations, hydrophilic associations such as hydrogen bonding, hydrophobic associations or Van der Waals forces. Superabsorbent polymers include internal crosslinking and surface crosslinking.

A "paste" is an adhesive composition of semisolid consistency, usually water-dispersible. More generally, a soft, viscous mass of solids dispersed in a liquid. For example, paste resins are finely divided resins mixed with a liquid medium to form fluid or semifluid mixtures, without use of low boiling solvents or water emulsions. A "coating" is a film or thin layer applied to a base material called a substrate.

Specifically, Applicants have discovered an aqueous superabsorbent polymer paste that can be used to coat various substrates and used in applications such as well drilling.

The present invention is directed to an aqueous superabsorbent polymer paste including from about 1 to about 5 wt % of superabsorbent polymer particles and from about 95 to about 99 wt % of an aqueous water-soluble polymer solution having from about 0.5 to about 5%, preferably from about 1 to about 3% solid level.

The present invention is further directed to an aqueous superabsorbent polymer paste comprising a) a composition comprising from about 55 to about 99.9 wt. % of polymerizable unsaturated acid group containing monomers; and from about 0.001 to about 5.0 wt. % of internal crosslinking agent; wherein the composition has a degree of neutralization of more than about 20%; and b) from about 95 to about 99 wt % of an aqueous water-soluble polymer solution having from about 0.5 to about 5%, preferably from about 1 to about 3% solid level.

The present invention is also directed to a method of preparing an aqueous superabsorbent polymer paste, said method comprising preparing an aqueous solution of pre-superabsorbent polymer, which is formed from at least one monomer, where the pre-superabsorbent polymer is capable upon being subjected to heating of becoming a superabsorbent polymer; and preparing a paste by thoroughly blending from about 1 to about 5 wt % of the superabsorbent polymer particles with from about 95 to about 99 wt % of an aqueous pre-superabsorbent polymer solution having from about 0.5 to about 5%, preferably from about 1 to about 3% solid level.

The present invention is also directed to a coated substrate comprising a substrate material and an aqueous superabsorbent polymer paste comprising a blend of i) from about 1 to about 5 wt % of superabsorbent polymer particles and ii) from about 95 to about 99 wt % of an aqueous water soluble polymer solution having from about 0.5 to about 5%, preferably from about 1 to about 3% solid level.

The present invention is also directed to a method for making a coated substrate comprising (a) preparing a dispersion comprising a particulate superabsorbent polymer and an aqueous water-soluble solution; (b) contacting a substrate with the dispersion to form a coating layer of the dispersion on the substrate; and (c) heat curing the coating layer for a period of time sufficient to form a water swellable, semi-gel coating layer.

The present invention is also directed to a water swellable coating comprising an aqueous superabsorbent polymer paste comprising a dispersion of from about 1 to about 5 wt % of superabsorbent particles and from about 95 to about 99 wt % of an aqueous water-soluble polymer solution wherein the water swellable coating is capable of absorbing and retaining a large quantity of water.

A method for reducing the loss of circulation fluids into flow passages of a subterranean formation during well drilling, completion or work over operations, method comprising: (a) directly introducing at the well-head into an effective amount of a dry, solid, water insoluble but gel-forming and water swellable aqueous superabsorbent polymer paste comprising a blend of a) from about 1 to about 5 wt % of superabsorbent polymer particles and b) from about 95 to about 99 wt % of an aqueous water-soluble polymer solution; wherein the superabsorbent polymer particles have a particle size distribution in the range of greater than about 150 microns to smaller than about 850 microns and which swells from about 25 to 300 times its weight of tap water when placed therein, and (b) allowing the aqueous superabsorbent polymer paste to enter the lost circulation zone and allowing the aqueous superabsorbent polymer paste to remain in said zone to absorb the aforesaid weight of water and swell to the appropriate volume thereby sealing fissures and reducing the loss of said circulation fluid upon resuming well drilling, completion or work-over operations.

The present invention is also directed to a method of preparing an aqueous superabsorbent polymer paste, said method comprising preparing an aqueous solution of pre-superabsorbent polymer, which is formed from at least one monomer, where the pre-superabsorbent polymer is capable upon being subjected to heating of becoming a superabsorbent polymer; and preparing a paste by thoroughly blending from about 1 to about 5 wt % of the superabsorbent polymer with from about 95 to about 99 wt % of an aqueous pre-superabsorbent polymer solution having from about 0.5 to about 5%, preferably from about 1 to about 3% solid level.

Suitable superabsorbent polymers for use in the present invention may be purchased from commercial sources or produced as set forth herein. One suitable superabsorbent polymer is FAVOR® 880 superabsorbent polymer, commercially available from Stockhausen Inc, Greensboro N.C.

The superabsorbent polymer is obtained by the initial polymerization of from about 55 to about 99.9 wt. % of polymerizable unsaturated acid group containing monomers. Suitable monomers include those containing carboxyl groups, such as acrylic acid, methacrylic acid or 2-acrylamido-2-methylpropanesulfonic acids, or mixtures of these monomers are preferred here. It is preferable for at least about 50-weight.%, and more preferably at least about 75 wt. % of the acid groups to be carboxyl groups. The acid groups are neutralized to the extent of at least about 25 mol %, preferably 25 mole % to 80 mole %, that is the acid groups are present in salt form. It is preferred to obtain polymers obtained by polymerization of acrylic acid or methacrylic acid, the carboxyl groups of which are neutralized to the extent of 50–80-mol %, in the presence of internal crosslinking agents.

The superabsorbent polymer further includes from about from about 0.001 to about 5.0 wt. % of internal crosslinking agent. The internal crosslinking agent has at least two ethylenically unsaturated double bonds or one ethylenically unsaturated double bond and one functional group which is reactive towards acid groups of the polymerizable unsaturated acid group containing monomers or several functional groups which are reactive towards acid groups can be used as the internal crosslinking component and which is present during the polymerization of the polymerizable unsaturated acid group containing monomers.

Examples of internal crosslinking agents include aliphatic unsaturated amides, such as methylenebisacryl- or -methacrylamide or ethylenebisacrylamide, and furthermore aliphatic esters of polyols or alkoxylated polyols with ethylenically unsaturated acids, such as di(meth)acrylates or tri(meth)acrylates of butanediol or ethylene glycol, polyglycols or trimethylolpropane, di- and triacrylate esters of trimethylolpropane which is preferably oxyalkylated, preferably ethoxylated, with 1 to 30 mol of alkylene oxide, acrylate and methacrylate esters of glycerol and pentaerythritol and of glycerol and pentaerythritol oxyethylated with preferably 1 to 30 mol of ethylene oxide and furthermore allyl compounds, such as allyl (meth)acrylate, alkoxylated allyl (meth)acrylate reacted with preferably 1 to 30 mol of ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid, and furthermore monomers which are capable of crosslinking, such as N-methylol compounds of unsaturated amides, such as of methacrylamide or acrylamide, and the ethers derived there from. Ionic crosslinkers such as multivalent metal salts may also be employed. Mixtures of the crosslinking agents mentioned can also be employed. The content of the internal crosslinking agents is from about 0.01 to about 5 wt. %, and preferably from about 0.1 to about 3.0 wt. %, based on the total amount of the polymerizable unsaturated acid group containing monomers.

The superabsorbent polymers may be surface crosslinked after polymerization. Surface crosslinking is any process that increases the crosslink density of the polymer matrix in the vicinity of the superabsorbent particle surface with respect to the crosslinking density of the particle interior. The absorbent polymers are typically surface crosslinked by the addition of a surface crosslinking agent. Preferred surface crosslinking agents include chemicals with one or more functional groups, which are reactive towards pendant groups of the polymer chains, typically the acid groups. The content of the surface crosslinking agents is preferably from about 0.01 to about 5 wt. %, and may be from about 0.1 to about 3.0 wt. %, based on the weight of the dry polymer. A heating step is preferred after addition of the surface crosslinking agent.

While particles of superabsorbent polymer are then used by way of example of the physical form of superabsorbent polymers, the invention is not limited to this form and is applicable to other forms such as fibers, foams, films, beads, rods and the like.

Further additives of the superabsorbent polymers according to the invention may optionally be employed, such as odor-binding substances, such as cyclodextrins, zeolites, inorganic or organic salts and similar materials; anti-caking additives, flow modification agents and the like.

The superabsorbent polymers are preferably prepared by two methods. The polymers can be prepared continuously or discontinuously in a large-scale industrial manner by the abovementioned known process, the after-crosslinking according to the invention being carried out accordingly.

According to the first method, the partly neutralized monomer, preferably acrylic acid, is converted into a gel by free-radical polymerization in aqueous solution in the presence of crosslinking agents and optionally further components, and the gel is comminuted, dried, ground and sieved off to the desired particle size. This solution polymerization can be carried out continuously or discontinuously.

Inverse suspension and emulsion polymerization can also be used for preparation of the products according to the invention. According to these processes, an aqueous, partly neutralized solution of monomers, preferably acrylic acid, is dispersed in a hydrophobic, organic solvent with the aid of protective colloids and/or emulsifiers and the polymerization is started by free radical initiators. The internal crosslinking agents either are dissolved in the monomer solution and are metered in together with this, or are added separately and optionally during the polymerization. The water is then removed azeotropically from the mixture and the polymer is filtered off and optionally dried. Internal crosslinking can be carried out by polymerizing-in a polyfunctional crosslinking agent dissolved in the monomer solution and/or by reaction of suitable crosslinking agents with functional groups of the polymer during the polymerization steps.

In one embodiment, the superabsorbent polymer is used in the form of discrete particles. Such particles have a mean particle size of from about 300 microns to about 500 microns. Superabsorbent polymer particles can be of any suitable shape, for example, spiral or semi-spiral, cubic, rod-like, polyhedral etc. Particle shapes having a large greatest dimension/smallest dimension ratio, like needles, flakes or fibers are also contemplated for use herein.

The paste is prepared by taking the superabsorbent polymer particles prepared above and dispersing it in an aqueous dilute water-soluble polymer solution having from about 0.5 to about 5%, preferably from about 1 to about 3% solid level. To make 1 kg of paste, about 30–50 g of commercial FAVOR® 880 superabsorbent polymer particles are thoroughly mixed with 950–970 g of diluted polymer solution at room temperature. The resulting paste was found to retain its lubricity for a long time if it was kept in a closed container.

The aqueous superabsorbent polymer paste of the invention is preferred to have a viscosity of at least 1000 mPa·s and 35,000 mPa·s at maximum, preferably at least 10000 mPa·s and 30,000 mPa·s at maximum, most preferably at least 15000 mPa·s and 25000 mPa·s at maximum, determined using a 2 to 5 wt.-% superabsorbent polymer particles in aqueous solution of water-soluble polymer.

The aqueous superabsorbent polymer paste thus produced may be applied on a prefabricated substrate according to well-known methods. Here, imprinting or knife coating on fabrics or nonwovens using a template is preferably chosen in order to achieve a uniform pattern with regular spacings between the single paste spots. Furthermore, it is possible to soak a nonwoven with this paste in a padder and subsequently squeeze it off to the desired liquid content. Suitable substrates include, but not limited to, polyethylene, polypropylene, polyamide, polyaramid, polyester, fiberglass, carbon, polyolefin, polyacrylic, rayon, cotton and wood pulp.

Subsequently, the aqueous superabsorbent polymer paste coated onto a substrate must be subjected to heating, which may be achieved by a short-term thermal treatment, the duration of the thermal treatment depending on the temperature and the neutralization degree of the polymer-bound carboxyl functions and the temperature stability of the support material. In any event, it is preferred to dry the coated substrate initially at room temperature. Then heat is applied at a temperature below the shrinking temperature of the substrate. With sheet materials, it is commonly between 50° C. and 150° C., preferably between about 75° C. and about 125° C.

For economical reasons, the available time for crosslinking is generally less than 5 minutes, preferably less than 2 minutes. Here, it is possible to perform drying and heating at a constant temperature or to select a temperature program to allow steps such as drying and crosslinking to be run at various temperatures. Also, a short-term subsequent heating, using an IR radiator, may be advantageous.

The aqueous superabsorbent polymer paste of the present invention has an absorption capacity of 15 g/g dry weight or more; and preferably 20 g/g dry weight or more. In addition, the aqueous superabsorbent polymer paste of the present invention has a paste expansion in tap water of 40 ml or more; in 0.9% saline composition of 20 ml or more; and in deionized water of 70 ml or more.

The aqueous superabsorbent polymer paste of the present invention can be used in drilling well operations. In particular the present invention includes a method for reducing the loss of circulation fluids into flow passages of a subterranean formation during well drilling, completion or work over operations, method comprising: (a) directly introducing at the well-head into an effective amount of a dry, solid, water insoluble but gel-forming and water swellable aqueous superabsorbent polymer paste comprising a blend of i) from about 1 to about 5 wt % of superabsorbent polymer particles and ii) from about 95 to about 99 wt % of an aqueous water-soluble polymer solution; which has a particle size distribution in the range of greater than about 150 micron to smaller than about 850 micron and which swells from about 25 to 300 times its weight of tap water when placed therein, and (b) allowing the aqueous superabsorbent polymer paste to enter the lost circulation zone and allowing the aqueous superabsorbent polymer paste to remain in said zone to absorb the aforesaid weight of water and swell to the appropriate volume thereby sealing fissures and reducing the loss of said circulation fluid upon resuming well drilling, completion or work-over operations.

To characterize the aqueous superabsorbent polymer paste set out in the Examples the equilibrium absorption and absorption capacity were measured in the following manner.

Absorption Capacity Test. The test was conducted at ambient conditions of room temperature. Absorption of 0.9% saline solution was determined by exposing a measured dimension substrate coated with known amount of aqueous superabsorbent paste to saline solution till it reached the equilibrium and reported as an average value of 2 measurements. About 3"×3" coated substrate material was taken in a petri dish and a known amount of saline solution was added to the dish and waited to let the solvent get absorbed. Additional solvent was intermittently added for about 30 minutes period and the contents of the dish were allowed to equilibrate for 1 hour at room temperature. Next, the dish was checked and an excess fluid if any was blotted by a paper towel and the dish with content was weighed again. Also, 2 uncoated sheets of the same dimension were used as controls.

The specific procedure is as follows:
1. Weigh a dry petri dish and record its weight as $W_1$.
2. Cut the coated sheet into 3×3-inch rectangles. Place it in a petri dish and weigh the dish with its content. Record the initial weight as $W_2$.
3. Add solvent into petri dish and allow the solvent to get absorbed. Add additional solvent intermittently over a period of 30 minutes.
4. Allow the dish with its content to equilibrate for 1 hour at room temperature. Next, blot an excess fluid with a paper towel and weigh the dish with its swollen material. Record this weight as $W_3$.

Then, the equilibrium absorption in grams and the Absorption Capacity property (measured in grams of liquid absorbed per gram of coated substrate) were calculated according to the following equations.

$$\text{Equilibrium Absorption } (g) = W_3 - W_2 \quad (1)$$

$$\text{Absorption Capacity } (g/g) = (W_3 - W_2)/(W_2 - W_1) \quad (2)$$

where:
$W_1$=dry weight in grams of petri dish
$W_2$=dry weight in grams of petri dish with coated sheet
$W_3$=wet weight in grams of petri dish with swollen coated sheet.

Procedure for absorbency measurement of control is as follows:
1. Weigh a dry 3×3 inch control sheet. Record this weight as $W_4$.
2. Immerse the dry sheet in the solvent and allow it to equilibrate for 1 hour.
3. Take wet sheet out of the solvent after equilibration and hang it from one of its corner for 10 minutes to drip off all unabsorbed fluid.
4. Weigh the wet uncoated sheet. Record this weight as $W_5$.

Then, the equilibrium absorption in grams and the Absorption Capacity property (measured in grams of liquid absorbed per gram of coated substrate) of control were calculated according to the following equations.

$$\text{Equilibrium Absorption } (g) = W_5 - W_4 \quad (3)$$

$$\text{Absorption Capacity } (g/g) = (W_5 - W_4)/W_4 \quad (4)$$

Where,
$W_4$=dry weight in grams of dry uncoated sheet $W_5$=we weight in grams of uncoated sheet.

Mean Particle Size Test Method

The particle size distribution of superabsorbent material is determined by placing a known weight of a sample in a Ro-Tap mechanical sieve shaker with U.S. standard sieves and shaking it for a specified period of time under defined conditions. Sample sections that are retained on each sieve are used to compute the mean particle size.

25±0.1 grams of superabsorbent is weighed and set aside for testing. The sieves are stacked on to the Ro-Tap in the following order from bottom to top: bottom pan, 325 mesh, 170 mesh, 50 mesh, 30 mesh, and 20 mesh. The superabsorbent sample weighed above is poured into the top sieve (#20) and then the sieve is covered. The Ro-Tap is allowed to run for 10 minutes and then stopped. The amount of superabsorbent retained on each pan is noted. The mass fraction of superabsorbent retained on each sieve is referred to as $m_i$, and is computed by taking the ratio of the retained mass of superabsorbent to the total mass of superabsorbent. For the purpose of computing the mean particle size, it is assumed that all the particles retained on a particular sieve have a size $r_i$, equal to the average of the sieve above and sieve it is retained on. For example, superabsorbent retained on the 50 mesh screen would be inferred to all be 450 μm (average of 300 um corresponding to the 50 mesh and 600 um corresponding to the 30 mesh). Samples retained on the 20 mesh sieve are assumed to be 1000 μm size. Samples retained on the pan are assumed to be 22 um (average of 44 um corresponding to the 325 mesh and 0 um corresponding to the pan). The mean particle size is then computed as:

$$MeanParticleSize = \Sigma m_i * r_i$$

Measurement of Paste Expansion

About 10–12 ml of paste was taken in three graduated measuring cylinders. The different aqueous fluids were added to each cylinder intermittently until an excess fluid level was obtained. The cylinders were covered with paraffin wax film and left to equilibrate at room temperature overnight. The expanded paste level was then directly noted from the cylinder readings. The paste expansion is done in solutions of tapped water, 0.9% saline solution and deionized water.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

A method of making the aqueous superabsorbent polymer paste of the present invention follows the following general procedure:

Step 1—Preparation of Pre-superabsorbent Polymer

An aqueous acrylic acid solution (50 grams acrylic acid in 374.91 grams of water) comprising approximately 3 mole percentage dimethylaminoethyl acrylate, relative to acrylic acid was neutralized with sodium hydroxide (NaOH) solution under cooling condition. The degree of neutralization amounted to about 50 mole percentage and the total monomer concentration amounted to 10 weight %. 500 gram of monomer solution was cooled to 10° C. and purged with nitrogen for 5 minutes. Subsequently, 10 gram of 1 weight % $H_2O_2$, 19.90 gram of 2.01 weight % sodium persulfate, 4.41 gram of 2.27% azo bis-2-amidino propane dihydrochloride and 10 gram of 0.5 weight % of sodium erythorbate were added. If polymerization does not begin within 5 minutes, a few drops of an aqueous $FeSO_4$ is added to kick off the reaction, which could be recognized by rapid rising of temperature of the monomer solution. The monomer solution became a very viscous solution after about 2 hours and the resulting viscous polymer solution was allowed to cool down to room temperature before it was ready to be used.

Step 2—Preparation of Paste.

Water soluble pre-superabsorbent polymer prepared in Step 1 was diluted to 1–2% solid level with water. To make 1 kg of paste, about 30–50 g of commercial FAVOR® SXM880 superabsorbent polymer was thoroughly mixed with 950–970 g of diluted polymer solution at room temperature. The resulting paste was found to retain its lubricity for a long time if it was kept in a closed container.

EXAMPLE 1

Viscosity Measurement

About 200 g each of a series of mixtures with varying amount of FAVOR® SXM880 superabsorbent polymer in diluted (1.59% solid level) water-soluble SAP prepared in Step 1 was prepared. The mixtures were left to equilibrate for 2 hours at room temperature. The viscosity measurement was carried out using a Brookfield DV-II+ Viscometer at room temperature using Spindle number 2 at a constant revolution per minute (RPM) for each SAP particles in water-soluble polymer solution mixture. Each mixture was sheared at 100 RPM for 5 minutes before actual measurement at a lower RPM level. The viscosity value was recorded from viscometer's digital readings.

| Experiment | SXM880 Concentration % | Physical Character | Viscosity mPa · s |
|---|---|---|---|
| 1 | 1.0 | Fluid (SAP particles in suspension) | 40 |
| 2 | 2.0 | Semi-paste | 560 |
| 3 | 3.0 | Paste | 1,640 |
| 4 | 4.0 | Paste | 13,800 |
| 5 | 5.0 | Paste | 27,440 |

EXAMPLE 2

Coating (On a Substrate) Experiment

About 28 g of superabsorbent polymer paste was coated with a glass rod on a 3"×3" perforated polypropylene sheet. The coated sheet was initially dried at room temperature and finally heated at 100 C for 2 hours.

The coated material was exposed to an aqueous medium as follows. The coated substrate was taken in a weighted ($W_1$) plastic dish and the content was weighed ($W_1$). Then weighed amount of 0.9% saline was added to the dish and weighted to let the solvent get absorbed. The additional solvent was intermittently added for about thirty minutes until free fluid appeared in the dish. The content of the dish was then allowed to equilibrate for 1 hour at room temperature. The dish was checked and excess fluid if any was blotted by a paper towel. The dish with swollen polypropylene sheet was weighed ($W_3$). Then, the equilibrium absorption in grams and the Absorption Capacity property (measured in grams of liquid absorbed per gram of coated substrate) were calculated using Equations 1 and 2 as described above.

A control sheet was weighed ($W_4$) and immersed in 0.9% saline and allowed to equilibrate similarly. Then it was taken out of the solvent and was hung with a clip from one corner for ten minutes to drip off all unabsorbed fluid. The wet sheet was weighed again ($W_5$). The amount of surface (perforated) adsorbed fluid was determined using Equations 3 and 4 as described above.

| Experiment Absorbency/Adsorbency | Fluid, g | Absorbed/Adsorbed g/g (dry weight basis) |
|---|---|---|
| Control (uncoated PP substrate, 0.226 g) | 2.0 | 8.8 |
| Paste coated substrate (dry weight 1.7 g) | 48.0 | 28.2 |

EXAMPLE 3

Measurement of Paste Expansion

About 10–12 ml of paste was taken in three graduated measuring cylinders. The different aqueous fluids were added to each cylinder intermittently until an excess fluid level was obtained. The cylinders were covered with paraffin wax film and left to equilibrate at room temperature overnight. The expanded paste level was then directly noted from the cylinder readings.

| Experiment | Paste Volume(ml) | Type of Aq. Fluid | Paste Expansion(ml) |
|---|---|---|---|
| 1 | 10 | 0.9% saline | 27 |
| 2 | 10 | Tap water | 46 |
| 3 | 12 | De-ionized water | 77 |

What is claimed:

1. An aqueous superabsorbent polymer paste comprising a blend of
   a) from about 1 to about 5 wt % of superabsorbent polymer particles, and
   b) from about 95 to about 99 wt % of an aqueous water-soluble polymer solution comprising from about 0.5 to about 5% solid level.

2. An aqueous superabsorbent polymer paste of claim 1 characterized in that it has an absorption capacity of 15 g/g dry weight or more.

3. An aqueous superabsorbent polymer paste of claim 1 characterized in that it has an absorption capacity of 20 g/g dry weight or more.

4. An aqueous superabsorbent polymer paste of claim 1 characterized in that it has a paste expansion in tap water of 40 ml or more.

5. An aqueous superabsorbent polymer paste of claim 1 characterized in that it has a paste expansion in 0.9% saline composition of 20 ml or more.

6. An aqueous superabsorbent polymer paste of claim 1 characterized in that it has a paste expansion in deionized water of 70 ml or more.

7. An aqueous superabsorbent polymer paste comprising
   a) a composition comprising from about 55 to about 99.9 wt. % of polymerizable unsaturated acid group containing monomers; and from about 0.001 to about 5.0 wt. % of internal crosslinking agent; wherein the composition has a degree of neutralization of more than about 20%; and
   b) from about 95 to about 99 wt % of an aqueous water-soluble polymer solution having from about 0.5 to about 5% solid level.

8. An aqueous superabsorbent polymer paste of claim 7 characterized in that the viscosity of the aqueous superabsorbent polymer paste will be from about 1000 mPa·s and to about 35,000 mPa·s.

9. An aqueous superabsorbent paste of claim 7 characterized in that the viscosity of the aqueous superabsorbent polymer paste will be from about 1000 mPa·s and to about 35,000 mPa·s.

10. A method of making an aqueous superabsorbent polymer paste, said method comprising
    a) preparing an aqueous solution of superabsorbent polymer, which is formed from at least one monomer, where the pre-superabsorbent polymer is capable upon being subjected to heating of becoming a superabsorbent polymer; and
    b) preparing a paste by thoroughly blending from about 1 to about 5 wt % of the superabsorbent polymer with from about 95 to about 99 wt % of an aqueous water-soluble polymer solution comprising from about 0.5 to about 5% solid level.

11. A method of claim 10 characterized in that the thermal subsequent treatment is effected within a range of from about 75° C. to about 200° C. when coating on a substrate.

12. An aqueous superabsorbent polymer paste of claim 7 characterized in that it has an absorption capacity of 15 g/g dry weight or more.

13. An aqueous superabsorbent polymer paste of claim 7 characterized in that it has an absorption capacity of 20 g/g dry weight or more.

14. An aqueous superabsorbent polymer paste of claim 7 characterized in that it has a paste expansion in tap water of 40 ml or more.

15. An aqueous superabsorbent polymer paste of claim 7 characterized in that it has a paste expansion in 0.9% saline composition of 20 ml or more.

16. An aqueous superabsorbent polymer paste of claim 7 characterized in that it has a paste expansion in deionized water of 70 ml or more.

* * * * *

UNITED STATES PATENT AND TRADEMARK OFFICE
CERTIFICATE OF CORRECTION

PATENT NO. : 7,163,969 B2  Page 1 of 1
APPLICATION NO. : 10/685080
DATED : January 16, 2007
INVENTOR(S) : Iqbal Ahmed et al.

It is certified that error appears in the above-identified patent and that said Letters Patent is hereby corrected as shown below:

Column 12
Claim 9, Line 22, "superabsorbent paste" should be replaced by -- superabsorbent polymer paste --.

Signed and Sealed this

Tenth Day of June, 2008

JON W. DUDAS
*Director of the United States Patent and Trademark Office*